Sept. 2, 1924. 1,507,059
H. HAWTHORN ET AL
APPARATUS FOR THE VULCANIZATION OF ARTICLES OF RUBBER,
RUBBER SUBSTITUTES, AND THE LIKE
Filed July 28, 1922
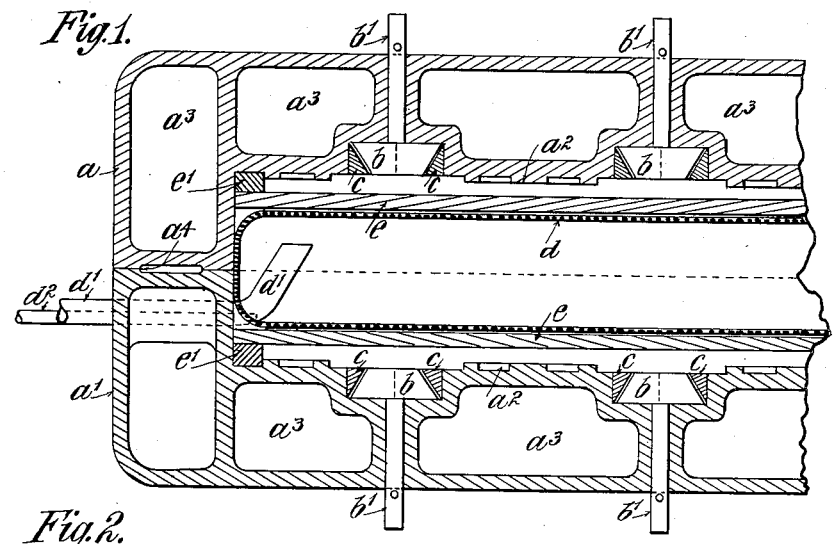
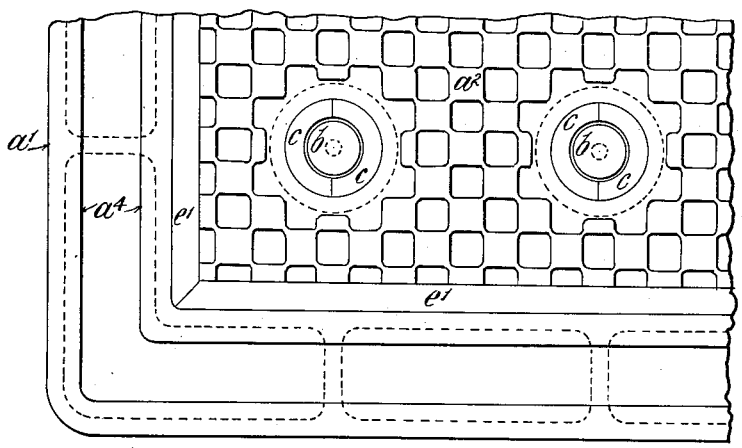
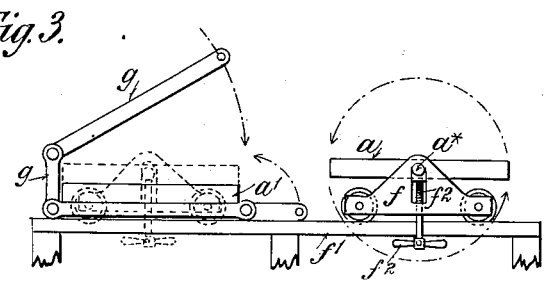
INVENTORS.

Patented Sept. 2, 1924.

1,507,059

UNITED STATES PATENT OFFICE.

HAROLD HAWTHORN AND HARRY AUGUSTUS HUNTLEY, OF LONDON, ENGLAND.

APPARATUS FOR THE VULCANIZATION OF ARTICLES OF RUBBER, RUBBER SUBSTITUTES, AND THE LIKE.

Application filed July 28, 1922. Serial No. 578,224.

*To all whom it may concern:*

Be it known that we, HAROLD HAWTHORN, a subject of the King of Great Britain, residing at 16 Upper Gloucester Place, London, England, and HARRY AUGUSTUS HUNTLEY, a subject of the King of Great Britain, residing at 28 Budge Row, Cannon Street, London, England, have invented new and useful Improvements in and Relating to Apparatus for the Vulcanization of Articles of Rubber, Rubber Substitutes, and the like, of which the following is a specification.

This invention relates to apparatus for the vulcanization of articles of rubber, rubber substitutes and the like, and has for its primary object the production of an improved form of vulcanizing mould whereby two separate sheets or articles are produced simultaneously without employing exterior pressure by means of a hydraulic or other press the required pressure being applied within the mould itself in conjunction with the vulcanizing medium by means of steam, hot air or water suitably controlled and supplied.

The present invention comprises essentially a mould made in two or more parts, a closed resilient receptacle or its equivalent adapted to be contained within said mould and when distended by fluid pressure to exert pressure against the walls of the mould or against interposed walls, means for securing the parts of the mould together, means for heating the parts of the mould for instance by steam jacketing and means for introducing steam or like fluid into the closed receptacle.

The parts of the mould are preferably each provided with separate steam jacketing or other heating means so as to avoid the making of a fluid tight joint between the meeting edges of the parts of the mould.

This invention will now more particularly be described making reference to the accompanying drawing, which shows by way of example a two part mould for use in producing simultaneously two sheets of vulcanized rubber for use on roadways and the like.

Fig. 1 is a broken view in sectional side elevation thereof.

Fig. 2 is a broken view in plan of one half of the mould, and

Fig. 3 is a diagrammatic view in end elevation showing one method of clamping the two parts of the mould together and means for allowing the two parts of the mould to be separated and to be readily filled with india rubber mixture before vulcanizing and to allow for removing the sheets after vulcanization.

Throughout the views similar parts are marked with like letters of reference.

Referring more particularly to Figs. 1 and 2, $a$, $a^1$ designates the upper and lower parts of the mould. Each of these parts is formed in a similar manner and their inner surfaces $a^2$ are formed with the desired pattern which each finished sheet is to receive. These surfaces are also provided with means for holding any desired adjuncts it is desired to embed or incorporate in the finished sheet or article. In the present case supports $b$ provided with shanks $b^1$ passing through holes in the walls of the mould are furnished to support annular cone shaped metal projections which project from the underside of the vulcanized sheet. Removable two part coned annular core pieces $c$ are provided between which and the cone shaped support $b$ is held the said annular cone shaped metal pieces.

The parts $a$, $a^1$ are so shaped as to produce an interior cavity, the patterned interior surfaces $a^2$ being some distance apart and within this cavity is placed a closed resilient receptacle $d$ preferably formed from fluid tight textile material. Loose cover plates $e$ are provided between which the receptacle $d$ is adapted to exert pressure. Distance pieces $e^1$ are provided round the edges of the cavity, the thickness of which will govern the thickness of the rubber sheets, it being understood that the rubber dough or mixture is placed on the surfaces $a^2$ after which the loose cover pieces $e$ are placed into position.

Each part $a$, $a^1$ is separately steam jacketed or provided with steam spaces $a^3$ and means, not shown on the drawings, is furnished for admitting steam or heated fluid to said spaces, in such case the joints $a^4$ between the two parts $a$, $a^1$ may be merely machined meeting surfaces.

A pipe $d^1$ communicates with the interior of the receptacle $e$ for the entry of steam and a similar pipe $d^2$ connected to a steam trap, allows for the escape of condensed water.

Any suitable means may be employed for clamping the two parts of the mould together, a convenient means is that illustrated on Fig. 3, in which the lower mould $a^1$ is a fixture and the upper mould $a$ is provided at its ends with trunnions $a^*$ which are carried on trolleys $f$. The trolleys $f$ are arranged to run on rails $f^1$. In order to raise and lower the mould $a$, the bearings of the trunnions $a^*$ are carried by screw gear $f^2$.

Articulated clamping bars $g$ are provided to hold the two parts $a$, $a^1$ firmly together during vulcanization.

Assuming the parts of the mould to be in the position shown on Fig. 3 i. e. the fixed part $a^1$ and the movable part $a$ with its inner surface uppermost, the rubber mixture or dough is filled in and the loose cover plates $e$ placed over it, the mould $a$ is then turned on its trunnions so that the inner surface is underneath, the trolley $f$ is then traversed on the rails $f^1$ until the mould $a$ is directly over the mould $a^1$, the flexible receptacle $d$ is then positioned between the cover plates $e$ and the screw gear $f^2$ operated to lower the mould $a$ on to the mould $a^1$. The clamping bars $g$ are then secured and the heat and steam pressure is applied for vulcanization, the pressure within the receptacle $d$, acting through the cover plates $e$ forces and keeps the rubber mixture or dough into intimate contact with the patterned surfaces $a^2$.

In a modification in place of the closed resilient receptacle $d$, when cover plates $e$ are employed, a ⊏ shaped packing strip may be used, the edges or arms of which are adapted to make a fluid tight joint with the inner surface of the cover plates.

It will be understood that although the invention is hereinbefore described with reference to a two part mould for producing two sheets of rubber at one operation by suitable modifications more than two articles may be produced at one operation or the mould may be formed in more than two parts.

We declare that what we claim and desire to secure by Letters Patent is:—

A vulcanizing mould for producing simultaneously two separate sheets or articles of india rubber comprising a two part mould, each part of which is the counterpart of the other, each part is provided with an internal recess, the surface of which has the shape, pattern or configuration of the exterior surface of the finished article and is provided with separate steam jacketing to avoid making a fluid tight joint between the meeting edges, removable supports and core pieces for holding adjuncts within the mould which it is desired to incorporate in the finished article, means for securing the two parts of the mould together, a closed resilient receptacle adapted to be contained within the cavity formed by the internal recesses in the two parts when assembled, distance pieces in the edges of the recesses to govern the thickness of the finished sheet, a pair of loose cover plates engaging said distance pieces and between which is placed the resilient receptacle and means for introducing fluid to distend the said receptacle so as to force the rubber mixture into intimate contact with the interior surfaces of the mould and adjuncts temporarily held therein, as set forth.

HAROLD HAWTHORN.
HARRY AUGUSTUS HUNTLEY.